Patented Nov. 9, 1948

2,453,637

UNITED STATES PATENT OFFICE 2,453,637

HYDRATED LIME PRODUCT AND METHOD OF MAKING THE SAME

Leonard John Minnick, Cheltenham, Pa., assignor to G. and W. H. Corson, Inc., Plymouth Meeting, Pa., a corporation of Delaware No Drawing. Original application July 2, 1943, Serial No. 493,288. Divided and this application December 2, 1946, Serial No. 713,465

8 Claims. (Cl. 106—118)

The present invention relates to a process for the treatment of dry hydrated lime and to the resulting product. The invention is directed to the treatment of a dry lime hydrate which normally possesses the property, when mixed with water, of retaining its initial soft consistency upon soaking, to impart thereto the property of forming a stiff mass with water which becomes softer when worked, making the product especially valuable for use as a finishing lime and for other purposes.

This application is a continuation-in-part of my copending application, Serial No. 422,593, filed December 11, 1941, now abandoned, and a division of my application Serial Number 493,288, filed July 2, 1943, now Patent No. 423,335, granted July 1, 1947.

At the present time, several types of lime are available to the trade, for example, lump lime, pebble lime, pulverized quicklime, all representing types of unslaked quicklime that can be prepared on the job. This material must be slaked to a putty and should be soaked for at least twenty-four hours, and when used for finishing purposes, should be screened to remove any foreign matter that may be present. Another type of lime that is commonly used is hydrated lime, in the form of a dry powder which has been prepared by slaking the lime in some form of hydrator at the time of its manufacture. When supplied to the job, it is customary for this material to be soaked with water and a period of several hours at least, and of twenty-four hours in general, of soaking is the recommended practice.

The above-mentioned limes, when prepared for use, will change in consistency to a stiff mass upon aging. When this putty is then worked with a trowel, a considerable amount of this stiffness is broken down and a soft workable consistency results. Thus, it is customary when soaking a box of lime to add to the water a sufficient quantity of the lime product to form a soft sloppy mass. On standing overnight, this mass will stiffen to a point where the putty will become rigid or gelled, and in effect will resemble the consistency of cream cheese. In this form, the material can be conveniently handled in a hod and can be transported from the box to the point where it is to be used. The mechanics of this stiffening action is not clearly understood. In the case of dolomitic lime, the gel may be influenced by the hydration of any magnesium oxide that is present. In the case of high calcium limes, however, where there is no material that is available for reaction with the water, the mechanism is rather obscure. In general, this property may be compared with the thixotropic nature of various colloids, which will form a gel when mixed with water, becoming fluid when agitated, and returning to a stiff gel when allowed to stand. In the case of most lime putties, however, once the mass has been worked, it will restiffen only at a very slow rate.

In the case of most hydrates, the length of time for which the hydrates must be soaked to form the stiff mass depends upon the particular hydrate employed, but, as will hereinafter appear, certain specially prepared hydrates do not form the stiff mass described, possessing the property of substantially retaining their initial soft consistency upon aging with water. In the case of the specially prepared hydrates which possess the property of substantially retaining their initial soft consistency upon aging with water, the treatment imparts to these hydrates the property of forming a stiff mass with water similar to the stiff mass obtained with the treated hydrates of the usual types.

Among the dry hydrated lime products which possess the property of retaining their initial consistency upon aging with water are the products hydrated by the methods described in Patent No. 2,309,168, issued January 26, 1943, and in copending application filed in the name of Bolton L. Corson, Serial No. 345,498, filed July 15, 1940 (now Patent No. 2,409,546). The hydrates prepared in accordance with these methods in which the lime is hydrated at super-atmospheric steam pressure also have, in general, the novel characteristics of forming a lime putty of maximum properties substantially immediately after mixing the dry powder with water. Thus, lime which has been hydrated by the methods mentioned attains its maximum or ultimate plasticity, sand-carrying capacity, and general workability substantially immediately upon mixture with water. Furthermore, the consistency of the putty that is formed when the dry powder and water are mixed together reaches substantially its ultimate value at once—and when this fluid material is permitted to stand for a period of hours, there is no appreciable change in the consistency of the putty. This feature is of tremendous value when the lime is mixed with sand as a mortar for masonry work. For instance, it obviates the necessity of retempering the mortar on the mortar board, and this, of course, saves an appreciable amount of time during application.

It may also be pointed out that while the product made by the methods described in the above-mentioned patent and application possesses properties not heretofore available in a dry lime hydrate and is being widely used in connection with lime in masonry, stuccoes, etc., the use of this product will be further advanced in the field of finishing lime if a stiff putty which can be handled in a hod can be made from it almost immediately. When the above product is further processed in accordance with the process of this application, this additional property is developed, and thus full advantage may be taken of the unusual qualities of the above product. That is to say, this product may have water added to it and a perfect stiff putty formed almost immediately, and this stiff putty handled the same as the stiff putties which were formed after many hours of soaking by other limes, the net result being that such a product may not only be handled and applied more quickly with the obvious saving in time and space required, but also all of the virtues are present in the lime itself, such as high plasticity, sand-carrying capacity, strength, adhesion, and soundness. The present invention as stated is applicable for the treatment of such hydrates to impart thereto the property of forming a stiff mass upon mixing with water, which mass becomes softer when worked.

One of the objects of the present invention is to provide a process for the manufacture of a dry hydrated lime which normally possesses the property of retaining its initial soft consistency upon aging with water to impart thereto the property of forming a stiff mass that becomes appreciably softer when worked, and hence, of improved suitability for application.

A further object of the invention is to furnish a process by which a dry lime hydrate of the type described, capable of forming with water, due to its unusual affinity therefor, a homogeneous mass devoid of any dry or agglomerated material, may be easily and economically prepared.

Still another object of the present invention is to provide a method for the production of a dry lime hydrate of the type described which possesses improved plasticity as compared to the untreated hydrate.

A more specific object of the invention is to provide a process for imparting the aforesaid properties to a lime hydrate which attains its maximum properties substantially immediately upon mixing with water.

Other objects, including the provision of a dry hydrated lime product having the properties herein set forth, will be apparent from a consideration of the specification and claims.

In accordance with the present invention, dry, finely divided lime hydrate of the type described is mixed with a carbonate-supplying ingredient which provides the hydrated lime product with a coating of calcium carbonate of thixotropic type when the product is mixed with water. This calcium carbonate associated with the hydrated lime particles imparts to the hydrated lime the property of forming a stiff mass after mixing with water, which mass becomes softer when worked. As will hereinafter appear, the carbonate-supplying ingredient may be carbon dioxide adsorbed on the particles of the dry lime hydrate or by an adsorbent, or made available by chemical reaction when the hydrated lime product is mixed with water, or it may be a carbonate which is sufficiently soluble in water to furnish carbonate ions for reaction with the hydrated lime. Obviously, the carbonate may be supplied by more than one of the aforesaid sources.

When the dry, treated hydrated lime product is mixed with water, the carbonate-supplying ingredient provides carbonate ions in solution, as will be further discussed, and these ions react with calcium ions resulting from the solutions of calcium hydroxide in the water to form calcium carbonate on the hydrated lime particles. It has been found that the calcium carbonate thus formed is of a particular type which produces the desired result. It is believed that the desired stiffening or gelling effect is produced as the result of the ability of the calcium carbonate to hold adjacent water in a temporary bound or oriented state, and the particular type of calcium carbonate formed is, therefore, designated herein as thixotropic-type calcium carbonate. This property is typical of that found in thixotropic suspensions, such as ferrous hydroxide in water, although, in the case of the calcium carbonate formed when the product of the invention is mixed with water, the mass will not readily stiffen after being worked. This calcium carbonate must take up its associated bound water in a relatively quiescent state after the lime solid has been mixed with the water. Once the stiffened mass is disturbed, such as by working with a trowel, the bound or oriented water is released and a softer working mass results. If any residual unreacted carbonate-supplying ingredient remains which has not reacted with the calcium hydroxide of the lime, then upon further standing of the mass, which has been worked, a further stiffening effect will result, the degree of which will be dependent upon the amount of unreacted reagent and the time allowed for the reaction to proceed.

As pointed out, the carbonate-containing ingredient mixed with the dry hydrated lime provides the hydrated lime particles, when the product is mixed with water, with a coating of thixotropic-type calcium carbonate. In the case carbon dioxide is the carbonate-supplying ingredient, the carbon dioxide derived from any of the aforementioned sources dissolve in the water when the dry hydrated lime product is mixed therewith, forming carbonic acid, and the carbonate ions thereof are then available for reaction with the hydrated lime. When a carbonate furnishing carbonate ions is employed, the carbonate ions are formed when the product is mixed with water, and these ions then react with the hydrated lime to form the thixotropic-type calcium carbonate. A small portion of the carbonate-supplying material may react with the particles of lime hydrate in the dry state, for instance, when the dry hydrate contains a small amount of free water, but in any case, unreacted carbonate-supplying material will be available for reaction to form a thixotropic-type of calcium carbonate when the product is mixed with water.

As previously stated, a dry hydrate of the type prepared by hydrating under super-atmospheric steam pressure and which possesses the property of retaining its soft consistency with water, and which attains its maximum properties substantially immediately after being mixed with water, is treated in accordance with the present invention. The processes described in the aforesaid patents produce such a hydrate, and, hence, may advantageously be employed in the preparation thereof.

As previously stated, the lime hydrate treated is dry, that is, it has the properties of a powder. When a carbonate is used as the carbonate-supplying material, the moisture content of the dry hydrated lime is relatively immaterial and the usual hydrated lime containing about 3% or more of free water may be employed. The term "dry lime hydrate" as used herein, unless otherwise qualified, includes hydrates that have the property of a powder, although as pointed out they may contain some free water.

When carbon dioxide serves as the carbonate-supplying ingredient, the use of substantially bone dry hydrated lime is preferred, since the most marked results are then obtained. However, dry hydrated lime containing a small amount of free water, for example, up to about 1%, may be used, although such a product may tend to lose some of its advantageous properties on storage. As a general rule, the lower the water content, the better; and unless a substantially bone dry hydrated lime is employed, the use of a dry hydrated lime containing not more than 0.2% to 0.4% free water is preferred.

As stated, carbon dioxide may be furnished by mixing, with the dry hydrated lime, a material such as silica gel or activated alumina in which carbon dioxide gas is adsorbed, or a material containing a carbonate (usually a mixture of two ingredients) which reacts upon contact with water to release carbon dioxide at a rate faster than the carbonate can react with the lime due to ion interchange. In this case, the released gas dissolves in the water, forming carbonic acid as previously explained. It will thus be seen that this material acts in substantially the same way as carbon dioxide adsorbed on the particles of the dry lime hydrate or by an adsorbent, and, hence, these means of supplying the carbonate are included herein within the phrase "carbon dioxide-supplying ingredient." When the dry hydrated lime is treated with a carbon dioxide-supplying ingredient, the rate of stiffening of the resulting lime product when treated with water is rapid, and the time required for soaking can be reduced to a very short time, if desired, even to a few minutes.

The carbonate-supplying material may be any inorganic carbonate of greater solubility than calcium carbonate, thus furnishing carbonate ions in the presence of water. Examples of carbonates that are applicable for use are sodium or potassium carbonate or bicarbonate, magnesium carbonate, zinc carbonate, ammonium carbonate or bicarbonate, and lead carbonate. Lead carbonate, however, forms a colored reaction product with the hydrated lime and carbonates of this type are generally not preferred. In cases where the presence of a relatively soluble reaction product between the lime hydrate and the carbonate (such as is formed when a sodium or potassium carbonate is employed) is objectionable, the use of a compound which forms relatively insoluble reaction products, for example, magnesium or zinc carbonate is recommended. Of the carbonates available for use, precipitated magnesium carbonate is preferred. The various carbonates do not develop the maximum properties in the same length of time, and, in general, the more soluble the carbonate, the more rapid is the reaction. For example, the use of sodium or potassium carbonate gives a relatively rapid stiffening effect as compared to the use of an equal quantity of magnesium or zinc carbonate. In general, a hydrated lime with which a carbonate of the type discussed is mixed stiffens at a materially slower rate than is the case when the lime is associated with a carbon dioxide-supplying material. In the case of the use of a relatively insoluble carbonate, the time required for soaking may extend over a period of an hour or more. The rate of stiffening may be observed when a carbonate forming a colored reaction product, such as lead carbonate, is employed, since as the reaction proceeds, the intensity of the color increases.

The amount of calcium carbonate of the thixotropic type necessary to promote the property of forming a stiff mass after mixing with water, which mass becomes softer when worked, is relatively small, namely, a few tenths per cent., for instance, 0.2% to 0.5% on the basis of the hydrate. Therefore, the amount of carbonate-supplying material required may also be relatively small. In the case carbon dioxide adsorbed on the particles of the dry hydrated lime serves as the carbonate-supplying material, the amount of carbon dioxide which can be adsorbed is limited, and in most instances an adsorption of about 1% carbon dioxide will be found to be the maximum. The use of adsorbed carbon dioxide in amounts as low as 0.1% have been found to be satisfactory and the preferable range is from 0.2% to 0.5% adsorbed carbon dioxide. In the case that the carbonate is supplied from the other sources, the amount employed may also be relatively small, for example, with relatively soluble carbonates, an amount of carbonate corresponding to the small amount of thixotropic-type calcium carbonate to be formed may be used. In the case of a relatively insoluble carbonate, the amount may be increased so that the desired stiffening action will be obtained in the desired time, for instance, twice or three times that required to give the amount of thixotropic-type calcium carbonate required may be used. The upper limit of carbonate-supplying material is relatively immaterial, since usually an excess will not interfere with the product or the properties thereof, but, in general, the use of more than about 3% to 5% of the material will not be employed, although, for example, in the case of magnesium carbonate, the use of as much as 10% and higher has been found to perform very well and without deleteriously affecting the other characteristics of the product when added to the hydrated limes which possess the property of substantially retaining their initial soft consistency upon aging with water such as the products prepared by the methods described in the aforesaid patents. Of course, in the case of a highly soluble carbonate, the use of a large excess is not desirable, since the products of reaction may interfere with the other characteristics of the product when it is employed for building and construction purposes. The use of a large excess over that required is not recommended in any case, since it represents an economic loss, the excess material or the reaction products thereof merely serving as adulterants or fillers in the product.

In preparing the product of the invention, except when carbon dioxide adsorbed by the particles of the lime hydrate is the carbonate-supplying material, the carbonate-supplying material may be mixed with the dry finely divided hydrated lime in any desired manner which provides a uniform mixture of the lime particles and the carbonate-supplying material. Advantageously, the carbonate-supplying material, as well as the dry hydrated lime, is in finely divided form. When the processes of Patent No. 2,309,168 and of Patent No. 2,409,546 are employed, the carbonate-containing material may, for example, be mixed with the hydrated lime after discharge of the hydrated product from the pressure hydrator in which it has been subjected to superatmospheric steam pressure and prior to the treatment of the hydrated lime in the tube mill, the action of the tube mill being relied upon to mix intimately the two components of the product. The mixing of the dry hydrated lime with the carbonate-containing material may be carried out at any convenient temperature, but in the case an adsorbent holding the carbon dioxide is to be mixed with the dry hydrated lime, the mixing will take place at a temperature below that which will drive the carbon dioxide from the adsorbent—the lower the temperature, the better.

In the preparation of the product where carbon dioxide adsorbed by the particles of lime hydrate is the carbonate-supplying material, the carbon dioxide may be furnished from any suitable source, for example, from carbon dioxide gas under pressure, from Dry Ice, or from flue gas, kiln gas, etc. The process may be conducted at atmospheric pressure, as an elevated pressure, or under a vacuum. The adsorption, for example, may be brought about in an open chamber with the carbon dioxide, either pure or diluted with another gas, such as air, passing over the surface of the powder, the powder being in a relatively thin layer or in larger bulk, in which case it may be turned by a suitable arrangement of mixing blades to bring it into contact with the carbon dioxide, or the dry powder may be dropped through an atmosphere of carbon dioxide gas; and the process may be conducted either in a continuous manner or batchwise. In one method, a known quantity of the dry hydrate is placed in a closed chamber provided with a mixing mechanism, and carbon dioxide is passed into the chamber, building up a small pressure therein. The mixing mechanism is then turned on and operated until the dry hydrated lime has adsorbed the carbon dioxide from the chamber and the pressure has been reduced to a constant value. The reduction of pressure to a constant value is a gauge by which it is possible to determine when the desired adsorption has been obtained. If desired, the closed chamber may be evacuated to a suitable pressure lower than atmospheric, and the process carried out by passing carbon dioxide in the desired amount into the chamber to create a higher pressure, the process being completed when the pressure drops to a constant value. If desired, the chamber may be evacuated to a very low positive pressure, for instance, in the neighborhood of 5 to 10 microns, thus freeing the dry hydrated lime from adsorbed air and moisture. The carbon dioxide may then be added in an amount corresponding to that to be adsorbed or in excess thereof. The dry lime hydrate may, of course, be treated by other methods by which the carbon dioxide is adsorbed.

The treatment of the dry hydrated lime with the carbon dioxide may be conducted at any desired temperature at which adsorption will take place. Generally, the lower the temperature of treatment the more efficient will be the adsorption and for this reason hydrated lime at room temperature will usually be treated. However, lime at an elevated temperature, for instance, lime immediately upon its removal from the hydrator at a temperature of 175° F. may be treated, but generally, the lime will be treated at a temperature below 100° F. The desired adsorption as previously indicated takes place rapidly and there is no necessity for the application of external heat; in fact, this is to be avoided since it is merely a waste of energy and the amount of gas adsorbed is reduced. Carbon dioxide will not react with bone dry calcium hydrate, but that, when moisture is present, there is a tendency for carbonatation. Therefore, if the lime treated contains a small amount of free water, some exothermic heat may be generated due to a carbonatation reaction. Since it is known that the carbonatation reaction is favored by elevated temperatures, it is evident that a relatively low temperature should be sustained throughout the treatment when the hydrated lime contains free moisture. Although water is a product of the carbonatation reaction, the amount produced is so small that it has no deleterious effect. In the preferred case where moisture is absent, treatment of hydrated lime with carbon dioxide gas does not generate any appreciable amount of heat.

As previously pointed out, although there may by a small amount of carbonatation, carbon dioxide is nevertheless adsorbed by the particles of the dry lime hydrate and it is the adsorbed carbon dioxide that is relied upon to give the described properties to the lime product. Other forms of carbonate may also be present in the dry hydrated lime product, for example, carbonate resulting from incomplete burning of the stone in the lime kiln. In addition, carbonate may be formed when hydrated lime is stored for long periods of time in paper bags. These carbonates and the addition of calcium carbonate solids to the hydrate do not have any effect on the stiffening action of the hydrate such as is obtained by the present invention.

It has been found that, when a hydrate of the type described has been treated in accordance with the present invention, the affinity which the dry powder has for water is greatly enhanced, and, therefore, by merely dumping the dry powder into the proper proportion of water and pushing the material under the surface of the water with some convenient implement, the powder absorbs the water at an extremely rapid rate and after a few minutes the entire mass is homogeneous and devoid of any dry or agglomerated material. It has also been found that the material thus treated will require a larger amount of water than the untreated material, and that, in spite of this additional water, the resultant putty will stiffen into a rigid mass which, when worked, for example with a trowel, becomes appreciably softer and more suited, therefore, for application. Another benefit derived from this treatment is illustrated by the fact that the plasticity of the putty formed from a hydrate prepared in accordance with the method of Patent No. 2,309,168 is as follows:

Plasticity of untreated hydrate measured immediately after mixture with water ____ 270
Plasticity of treated hydrate measured immediately after mixture with water _____ 310

The plasticity is measured on the Emley plasticimeter, as developed and standardized by the United States Bureau of Standards.

Aging the soaked treated hydrate, prepared from a hydrate which attains substantially its maximum properties immediately upon mixing with water, has little effect on the plasticity of the putty and other properties, although in some instances, the treated hydrate has shown a small increase in plasticity when soaked overnight, but this increase offers little practical advantage. It is to be understood, however, that if desired the above or any of the putties obtained from the treated hydrates can be soaked and aged before use.

The rate at which the stiffening of the putty takes place can be further altered by the use of retarders or accelerators. Thus, when the hydrated lime has been treated with a carbon dioxide-supplying material, a small amount, for example a few tenths of one per cent., of cream of tartar, Rochelle salt, sugar, glycerine, or other similar retarders will slow down the rate of stiffening, and such materials as magnesium sulphate, aluminum sulphate, and other salts of this type will increase the set to a point where the material practically takes a "flash set" when mixed with water. For practical purposes, the use of retarders and accelerators is, however, generally not necessary since the carbon dioxide-treated material will stiffen at a rate that is convenient for practically immediate use of the putty.

Considerable modification is possible in the methods of treatment of the dry hydrate of lime with the carbonate-supplying material, as well as in the conditions employed during treatment, without departing from the essential features of the invention.

I claim:

1. The process of treating a dry finely divided hydrated lime which has been hydrated under super-atmospheric steam pressure and which attains substantially its ultimate properties, including fluid consistency and plasticity, substantially immediately upon mixing with water, which fluid consistency remains substantially the same upon aging with water, to convert said hydrate into a product in dry powdered form capable of forming a gel in admixture with water which gel upon subsequent working reverts to fluid consistency, and to impart other improved properties to said hydrated lime, including an increase in the affinity of said hydrate for water, which comprises mixing with said dry finely divided hydrated lime a dry inorganic carbonate of greater water-solubility than calcium carbonate, at least a substantial portion of which is non-reacted chemically with said dry hydrated lime to provide a product which, when mixed with water, furnishes carbonate ions for reaction with said hydrated lime to form thixotropic-type calcium carbonate on the particles of said hydrated lime and thus impart said properties to the product.

2. The process of claim 1 wherein the dry inorganic carbonate is present in an amount less than about 5%.

3. The process of claim 1 wherein the dry inorganic carbonate provides relatively insoluble, colorless reaction products when reacted with said hydrated lime and is present in an amount less than about 3%.

4. The process of claim 1 wherein the dry inorganic carbonate is precipitated magnesium carbonate and is present in an amount less than about 3%.

5. A dry finely divided hydrated lime of improved properties, including an increase in the affinity of said hydrate for water, and characterized by its ability to attain substantially its ultimate plasticity substantially immediately upon mixing with water and to form a gel shortly thereafter comprising a mixture of dry finely divided hydrated lime which has been hydrated under super-atmospheric steam pressure and which attains substantially its ultimate properties, including fluid consistency and plasticity, substantially immediately upon mixing with water, which fluid consistency remains substantially the same upon aging with water, and a dry inorganic carbonate of greater water-solubility than calcium carbonate, which, when the product is mixed with water, furnishes carbonate ions for reaction with said hydrated lime to form thixotropic-type calcium carbonate upon the particles of said hydrated lime to convert the product of fluid consistency first formed into a gel shortly after admixture with water, which gel upon subsequent working reverts to a fluid consistency.

6. The product of claim 5 wherein the dry inorganic carbonate is present in an amount less than about 5%.

7. The product of claim 5 wherein the dry inorganic carbonate provides relatively insoluble, colorless reaction products when reacted with said hydrated lime and is present in an amount less than about 3%.

8. The product of claim 5 wherein the dry inorganic carbonate is precipitated magnesium carbonate and is present in an amount less than about 3%.

LEONARD JOHN MINNICK.

REFERENCES CITED

The following references are of record in the file of this patent:

UNITED STATES PATENTS

| Number | Name | Date |
|---|---|---|
| 1,604,575 | Holmes | Oct. 26, 1926 |
| 2,309,168 | Carson | Jan. 26, 1943 |
| 2,409,546 | Carson | Oct. 15, 1946 |

Certificate of Correction

Patent No. 2,453,637.  November 9, 1948.

LEONARD JOHN MINNICK

It is hereby certified that errors appear in the printed specification of the above numbered patent requiring correction as follows:

Column 1, line 16, for the numeral "423,335" read *2,423,335*; column 4, line 7, for "solutions" read *solution*; line 46, for "dissolve" read *dissolves*; column 7, line 24 for "as" read *at*;

and that the said Letters Patent should be read with these corrections therein that the same may conform to the record of the case in the Patent Office.

Signed and sealed this 1st day of March, A. D. 1949.

[SEAL]

THOMAS F. MURPHY,
*Assistant Commissioner of Patents.*